April 18, 1967

A. C. DURHAM 3,314,701

DOWEL SCREW ASSEMBLY

Filed April 29, 1965

INVENTOR
ALAN CARL DURHAM

BY *Roy A. Plant*

ATTORNEY

United States Patent Office 3,314,701
Patented Apr. 18, 1967

3,314,701
DOWEL SCREW ASSEMBLY
Alan C. Durham, 218 E. Chicago,
Allen, Mich. 49227
Filed Apr. 29, 1965, Ser. No. 451,927
6 Claims. (Cl. 287—189.36)

The present invention relates broadly to an accurate positioning means for a die structure assembly, and in its specific phases to a dowel screw to accurately locate and hold a die structure together.

At the present time, the machining and manufacturing industry is faced wth the tremendous challenge of holding costs down as the accuracies of manufacturing are becoming more precise daily, and many mass-produced parts now require the same precision which a few years ago was only demanded on high-cost precision parts. While the precision standard is being raised, the cost requirements demand that prices remain the same or decrease to keep the manufacturers competitive in their own markets and also in foreign markets.

The tool and die industry is an art which requires workers of very high skill, and this industry has not been successfully automated to date. Although many new machine tools have been developed to increase the efficiency of the tool and die shops, a cost reduction has not always been realized. Many times, the cost of available new equipment is prohibitive, and other times the new equipment would permit better machining but it is not able to substantially reduce the manufacturing time per unit.

Die structure assemblies over the years have been used with dowel pins, requiring tight or medium force fits, and standard screws for holding the assembly together. The dowl pins are used to accurately position and locate the parts while the standard screws hold them in contact. Jack screw holes have been necessary to separate the die structure assembly; for example, when resharpening a tool held by the die structure assembly, when the part or tool held by the die structure assembly has been broken or damaged in other ways, when new set-ups were being made, et cetera.

This present method used for meeting the precision demands required a sizable number of holes for each die structure assembly. It has also presented many problems, especially on small die structure assemblies, and has often weakened the strength of the die structure assembly. Also, with the large number of holes required, often the die makers are unable to visualize the numerous requirements and uses to which the die structure assembly will be put. This causes the die maker to position holes in restrictive locations, thus hampering assembly and disassembly and many times limiting the beneficial use of the assembly, and sometimes even requiring the die structure assembly to be scrapped completely.

Accordingly, among the objects of the present invention is the provision of a simple dowel member which both locates and holds a die structure assembly together as a unit.

Another object is to provide a die structure assembly which is made with a minimum of machining time and reduces the assembly and disassembly time required to put the die structure assembly in operation.

A further object is to provide a precision die structure assembly using very simple elements which can require one standard tool for both assembly and disassembly.

A further object is to provide a simple die structure assembly having a reduced number of fastening members and machine holes.

A further object is to provide the die structure assembly of the present invention which eliminates the necessity of jack screws to disassemble the structure.

A further object is to provide a die structure assembly requiring a minimum number of fastening members so that there is a maximum unobstructed area for the die structure assembly, thus giving it maximum strength and force absorbing characteristics.

Also, an object of the present invention includes the provision of a die structure assembly capable of accomplishing the above objectives with a minimum of material cost and fabricating expense, and at the same time being composed of a simple and ruggedly formed structure which is very reliable in application.

Still further objects and advantages of the present invention will appear as the description proceeds.

To the accomplishment of the foregoing and related ends, the invention, then, consists of a special and simple dowel screw and die structure assembly hereinafter fully described and particularly pointed out in the claims, the annexed drawing and the following description setting forth in detail certain means to carry out the invention, such disclosed means illustrating, however, but one of various ways in which the principle of the invention may be used.

Figure 1:
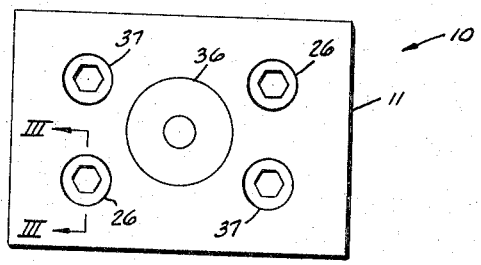
FIGURE 1 is a plan top view of a typical sample die structure assembly.
Figure 2:
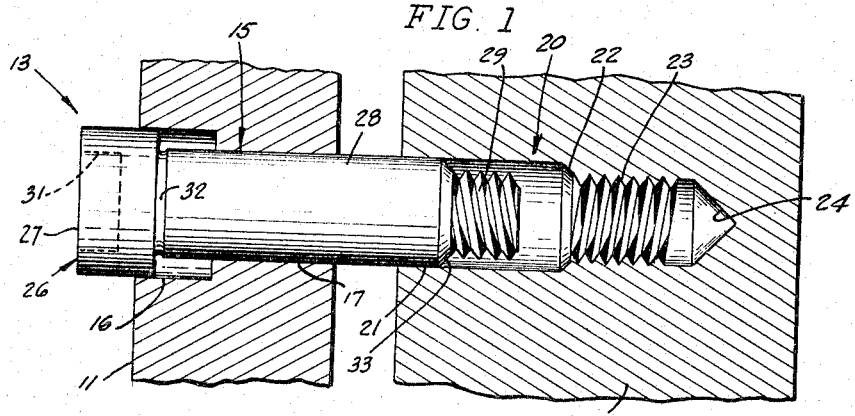
FIGURE 2 is a partial sectional side elevation view of a die structure assembly being put together and showing the dowel screw as it is inserted in the dowel screw hole of the die structure assembly.
Figure 3:
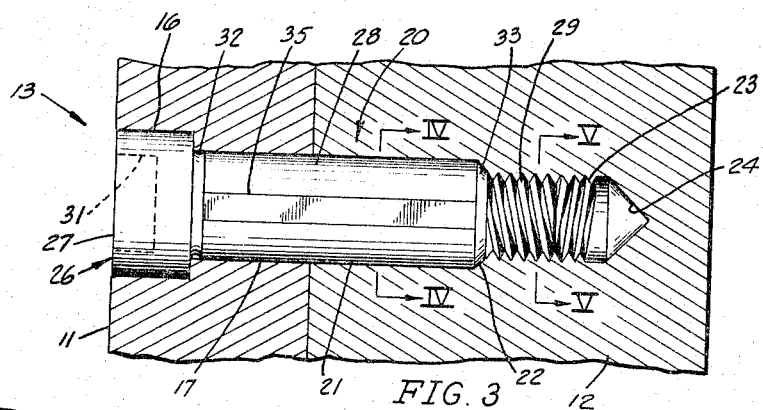
FIGURE 3 is a partial sectional side elevation view of a die structure assembly after the dowel screw is in its assembled position taken along line III—III of FIGURE 1, as seen looking in the direction of the arrows.
Figure 4:
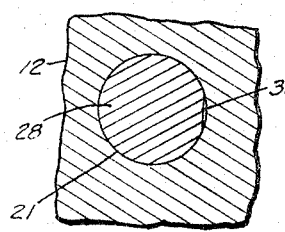
FIGURE 4 is a partial sectional view of the locating body of the dowel screw located in the dowl hole taken along line IV—IV of FIGURE 3, as seen looking in the direction of the arrows.
Figure 5:
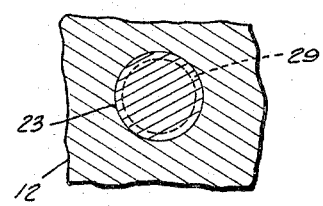
FIGURE 5 is a partial sectional view of the holding threads of the dowel screw taken along line V—V of FIGURE 3, as seen looking in the direction of the arrows.

Referring to the drawing, a die structure assembly is shown and generally referred to as 10 which consists of a surface support member 11, a body block member 12, and a dowel screw assembly 13. The surface support member 11 has a dowel screw hole 15 which has a countersunk hole 16 and a dowel locating hole 17. The body block member 12 has a dowel screw hole 20 which consists of dowel locating hole 21, chamfer surface 22, in a preferred embodiment, threaded hole 23 and drill hole 24. The drill hole 24 has no functional purpose but is required because of present day manufacturing techniques.

The dowel screw assembly 13 incudes some of the elements associated wtih the surface support member 11 and the body block member 12. Dowell screw assembly 13 also includes the dowel screw 26. The dowel screw 26 has a securing head 27, a dowel body 28, and a holding thread 29. The securing head 27 provides the dowel screw 26 with an actuation means to turn the dowel screw 26 when assembling or disassembling the die structure assembly 10. In the present case there is a recess 31 in which a standard Allen head tool can be inserted by the user to turn the dowel screw 26. The securing head 27 is joined to the dowel body 28, and there is an undercut 32 connecting them which has benefit for use in standard machine tool manufacturing techniques. The dowel body 28 is connected to the holding thread 29 by chamfer 33, in a preferred embodiment. The chamfer 33 acting against chamfer surface 22 can give beneficial effects in locating and preventing damage to the dowel screw 26 during assembly.

The holding thread 29 and the threaded hole 23 can be of various diameters. In many applications, the threaded hole 23 would be nearly the size of dowel locating holes 17 and 21 which would help facilitate the manufacturing of the units. To make the dowel screw hole 20, the initial operation would be to drill a hole into the body block member 12 forming drill hole 24, which could be a rough drill operation. By "hogging out" a large amount of material from body block member 12 to start forming the dowel screw hole 20, it would require less material to be removed when drilling the dowel locating hole 21 while preparing it for a ream operation.

The dowel locating holes 17 and 21 act with the dowel body 28 to position the surface support member 11 with respect to the body block member 12. The securing head 27 acts with the countersunk hole 16 to hold the surface support member 11 in contact with the body block member 12. The holding threads 29 are screwed into threaded hole 23 drawing the securing head 27 into position in the countersunk hole 16. The holding threads 29 and the threaded hole 23 need not be of great accuracy; neither does the countersunk hole 16 and the securing head 27. There is merely a holding function, with the locating taking place between the locating body 28 and the dowel locating holes 17 and 21, as described above. Dowel body 28 is provided with an air flat 35 which permits the air in the dowel screw hole 20 to escape to the atmosphere as the dowel screw 26 is positioned in the dowel screw assembly to form the die structure block 10.

As viewed in FIGURE 1, we have a typical die structure assembly 10 showing die button holes 36 formed in the surface support member 11. We have two dowel screws 26 and two standard screws 37. In this application the two dowel screws 26 will position and accurately locate the surface support member 11 to a body block member 12, not shown in FIGURE 1, of the die structure assembly 10. The standard screws 37 are needed during manufacturing, assembly and use to help hold the surface support member 11 against the body block member 12 while the dowel screw assembly 13 is being machined and to give four cornered support while the die structure assembly is being used.

The present invention eliminates the need for having the additional jack screw holes to separate the surface support member 11 from the die block assembly 12 when disassembly is needed for any reason such as retooling, et cetera. It also eliminates the need for two additional standard screws 37 when the standard dowel pin method is used to give the four cornered support.

Other illustrations could be given, for example, if the surface support member 11 was of a narrow structure, only two dowel screws 26 and one standard screw 37 would be necessary giving us our locating and holding point features, and again there is no necessity for the jack screw holes.

While but one form of the invention has been shown and described, other forms within the spirit and scope of the invention will now be apparent to those skilled in the art. Therefore, the embodiments shown in the drawing are to be considered as merely being set forth for illustrative purposes and are not intended to limit the spirit and scope of the invention herein described and shown.

Other modes of applying the principles of my invention may be employed instead of the one explained, change being made as regards the details described herein, provided the means stated by any of the following claims or the equivalent of such stated means be employed.

I therefore particularly point out and distinctly claim as my invention:

1. A die structure assembly accurately positioning a first and second member together, comprising,
    (a) a dowel screw assembly securing and positioning said first and second members together,
    (b) a dowel screw as part of said dowel screw assembly,
    (c) said dowel screw having an elongated dowel body portion with an enlarged securing head connected at one end and a first holding means connected at the other end defined by an externally threaded portion of less diameter than said body portion, said securing head having means thereon for receiving a turning tool,
    (d) said dowel body portion having substantially a circular cross section and having an axially directed flat surface of relatively narrow width extending throughout the length thereof to permit air in said locating holes to escape to the atmosphere,
    (e) said first and second members with concentric dowel locating holes having substantially circular cross sections,
    (f) said dowel body portion locating said first member with respect to said second members by tightly fitting in and contacting said dowel locating holes,
    (g) a second holding means in the locating hole of said second member defined by a threaded hole to receive the threaded portion of said dowel screw, said threaded hole being substantially concentric with said locating hole and which may have a closed inner end, and
    (h) said first and second holding means acting together causing said securing head to act on said first member holding it in contact with said second member.

2. A die structure assembly as specified in claim 1, and further characterized in that
    (a) said turning tool has means to move said first holding means into and out of said second holding means.

3. A die structure assembly as specified in claim 2, and further characterized in that
    (a) a chamfer surface joins said second member's dowel locating hole and said second holding means, and
    (b) a chamfer connects dowel body portion and said first holding means.

4. A die structure assembly as specified in claim 3, and further characterized in that
    (a) an undercut is provided on said dowel body portion adjacent said securing head.

5. A die structure assembly accurately positioning a first and second member together, comprising
    (a) at least one standard screw to hold said first and second members in contact,
    (b) at least one dowel screw to hold and accurately position said first and second members with each other,
    (c) said dowel screw having a dowel body portion,
    (d) said dowel body portion having substantially a circular cross section,
    (e) an air flat portion along the circumference of said dowel body portion extending throughout the length thereof and substantially parallel to the axis of said dowel body portion,
    (f) said dowel screw having a securing head connected at one end and a first holding means connected at the other end,
    (g) said first member having a first dowel locating hole with substantially a circular cross section,
    (h) said second member having a second dowel locating hole with substantially a circular cross section,
    (i) said dowel body portion contacting said first and second dowel locating holes and positioning them concentric to each other,
    (j) a second holding means in said second dowel locating hole, and
    (k) said first and second holding means acting together causing said securing head to act on said first member holding it in contact with said second member.

6. A die structure assembly as specified in claim 5, and further characterized in that (a) recesses are positioned in said standard screw and said dowel screw to receive a turning tool.

References Cited by the Examiner
UNITED STATES PATENTS

| | | | |
|---|---|---|---|
| 1,519,126 | 12/1924 | Furlan | 85—1 |
| 2,056,309 | 10/1936 | Osenberg | 85—19 |
| 2,560,413 | 7/1951 | Carlson | 85—14 |
| 3,101,210 | 8/1963 | Johnson | 85—1 |
| 3,122,048 | 2/1964 | Warner | 85—1 |

CARL W. TOMLIN, *Primary Examiner.*

R. S. BRITTS, *Assistant Examiner.*